US012520344B2

(12) United States Patent
Lin

(10) Patent No.: US 12,520,344 B2
(45) Date of Patent: Jan. 6, 2026

(54) USER EQUIPMENT AND METHOD OF PERFORMING TRANSMISSION IN SHARED SPECTRUM BY SAME

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 378 days.

(21) Appl. No.: 17/994,571

(22) Filed: Nov. 28, 2022

(65) Prior Publication Data
US 2023/0232447 A1  Jul. 20, 2023

Related U.S. Application Data

(63) Continuation of application No. PCT/IB2020/000791, filed on May 29, 2020.

(51) Int. Cl.
*H04W 74/0808* (2024.01)
*H04W 74/00* (2009.01)

(52) U.S. Cl.
CPC ..... *H04W 74/0808* (2013.01); *H04W 74/002* (2013.01)

(58) Field of Classification Search
CPC .......................... H04W 74/002; H04W 74/0808
See application file for complete search history.

(56) References Cited

U.S. PATENT DOCUMENTS

| | | | | |
|---|---|---|---|---|
| 2018/0368090 A1* | 12/2018 | Kadambar | ............ | H04W 8/005 |
| 2021/0092783 A1* | 3/2021 | Sun | .................... | H04W 74/0875 |
| 2021/0136732 A1* | 5/2021 | Fakoorian | ............. | H04W 28/26 |
| 2021/0195637 A1* | 6/2021 | Xue | .................... | H04W 74/0808 |
| 2021/0368351 A1* | 11/2021 | Cui | ...................... | H04W 74/002 |
| 2022/0078845 A1* | 3/2022 | Xu | ........................ | H04L 5/0053 |
| 2022/0264648 A1* | 8/2022 | Wu | .................... | H04W 74/0816 |

OTHER PUBLICATIONS

3GPP TSG-RAN WG1 Meeting #93 Tdoc R1-1806253, Busan, Korea, May 21 -25, 2018, Agenda Item: 7.6.4.1. Source: Ericsson, Title: Channel access mechanisms, Document for: Discussion, Decision.
3GPP TSG RAN WG1 Meeting #85 R1-164603, Nanjing, China May 23-27, 2016, Source: ZTE, Title: Discussion on the UL LBT for LAA, Agenda item: 6.2.1.5, Document for: Discussion and Decision.
International Search Report in the international application No. PCT/IB2020/000791, mailed on Feb. 1, 2021.
Written Opinion of the International Search Authority in the international application No. PCT/IB2020/000791, mailed on Feb. 1, 2021.
First Office Action of the European application No. 20816301.4, issued on Jul. 25, 2025.

* cited by examiner

*Primary Examiner* — Kashif Siddiqui
(74) *Attorney, Agent, or Firm* — Ladas & Parry LLP

(57) ABSTRACT

A user equipment (UE) and a method of performing transmission in a shared spectrum by the same are provided. The method includes initiating a channel occupancy (CO) and sharing the CO to at least a second UE. This can solve issues in the prior art and provide a method that the CO initiated by the UE can be shared with other one or more UEs, so that the one or more UEs can have higher probability to access a channel, leading to a low latency communication.

20 Claims, 16 Drawing Sheets

| MCOT duration |||||
|---|---|---|---|---|
| Ue1 data transmission | | | UE4 acknowledgement | |
| slot n | slot n+1 | slot n+2 | slot n+3 | slot n+4 |

FIG. 8

USER EQUIPMENT AND METHOD OF PERFORMING TRANSMISSION IN SHARED SPECTRUM BY SAME

CROSS-REFERENCE TO RELATED APPLICATION

This application is a continuation of International Application No. PCT/IB2020/000791 filed on May 29, 2020, the disclosure of which is hereby incorporated by reference in its entirety.

BACKGROUND

Device-to-device communication is a D2D-based sidelink (SL) transmission technology, which is different from a conventional cellular system in that communication data is received or sent through a base station, so it has a higher spectrum efficiency and lower transmission delay. The car-to-vehicle system adopts a D2D direct communication method, and 3GPP defines two transmission modes: a first mode and a second mode.

The first mode: transmission resources of a terminal are allocated by the base station, and the terminal sends data on side-link according to the resources allocated by the base station. The base station can allocate the resources for a single transmission to the terminal, or can allocate semi-static transmission for the terminal resources. FIG. 1 illustrates sidelink communication in a coverage of a network. As illustrated in FIG. 1, a terminal (such as a user equipment, UE) is located within the coverage of the network, and the network allocates transmission resources used by the terminal for side transmission.

In new radio vehicle-to-everything (NR-V2X), it is necessary to support automatic driving, so it puts forward higher requirements for data interaction between vehicles, such as higher throughput, lower delay, higher reliability, greater coverage, more flexible resource allocation, etc.

In long term evolution (LTE)-V2X, broadcast transmission is supported. In NR-V2X, unicast and multicast transmission methods are introduced. For unicast transmission, there is only one terminal at the receiving end. As illustrated in FIG. 2, tuicast transmission is performed between UE1 and UE2. For multicast transmission, the receiving end is all terminals in a communication group, or is in a certain transmission. All terminals within the distance, as illustrated in FIG. 3, UE1, UE2, UE3, and UE4 form a communication group, in which UE1 sends data, the other terminal devices (UE2, UE3, and UE4) in the group are all receiver terminals. For broadcast transmission, as illustrated in FIG. 4, UE1 is the sending terminal, and other terminals (UE2, UE3, UE4, UE5, and UE6) around UE1 are all receiving terminals.

In an unlicensed band, an unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy with the UE, the UE can use an LBT mode with higher priority than that used by the UE itself to obtain the channel, thereby obtaining the channel with greater probability.

When a base station (such as a gNB) schedules physical uplink shared channel (PUSCH) or pre-configures PUSCH resources, the PUSCH resources might not be in the gNB's CO. In this case, a UE will perform LBT category 4, that is Type 1 uplink (UL) channel access. But later, when the gNB obtains a new CO before the scheduled or pre-configured PUSCH occurs, the gNB can share the CO with the UE, then UE might be able to adapt its LBT category from Cat4 to Cat2. Equipment using the unlicensed band is classified into frame based equipment (FBE) or load based equipment (LBE). the FBE does less damage to neighboring Wi-Fi devices sharing an unlicensed band, compared to the LBE. Generally, the LBE is more likely to occupy the unlicensed band than the FBE. This is because the Wi-Fi device is taking more chances to occupy the unlicensed band. In the 3GPP standard, an FBE scheme is referred to as CAT2 LBT and an LBE scheme is referred to as CAT4 LBT.

Shifting sidelink communications to shared spectrum is still an open issue. Therefore, there is a need for a user equipment (UE) and a method of performing transmission in a shared spectrum by the same, which can solve issues in the prior art and provide a method that the CO initiated by the UE can be shared with other one or more UEs, so that the one or more UEs can have higher probability to access a channel, leading to a low latency communication.

SUMMARY

The present disclosure relates to the field of communication systems, and more particularly, to a user equipment (UE) and a method of performing transmission in a shared spectrum by the same, which can provide a good communication performance and high reliability.

An object of the present disclosure is to propose a user equipment (UE) and a method of performing transmission in a shared spectrum by the same, which can solve issues in the prior art and provide a method that the CO initiated by the UE can be shared with other one or more UEs, so that the one or more UEs can have higher probability to access a channel, leading to a low latency communication.

In a first aspect of the present disclosure, a method of performing transmission in a shared spectrum by a user equipment WE) includes initiating a channel occupancy (CO) and sharing the CO to at least a second UE.

In a second aspect of the present disclosure, a UE includes a memory, a transceiver, and a processor coupled to the memory and the transceiver. The processor is configured to initiate a channel occupancy (CO) and the transceiver is configured to share the CO to at least a second UE.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 8 is a schematic diagram illustrating an example of a UE initiating a CO and sharing the CO with other UEs according to an embodiment of the present disclosure.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For some indoor use case such as virtual reality (VR) and augmented reality (AR) gaming, where extremely high throughput and low latency transmission is envisioned. A direct device to device communication via sidelink can significantly reduce the transmission latency. Moreover, shifting sidelink communications to shared spectrum can offload the licensed spectrum usage and in some region can also accelerate the commercial deployment. However, the potential latency increase due to channel access failure will introduce a bottleneck for the sidelink over shared spectrum. Some embodiments of the present disclosure provide a method that a channel occupancy (CO) initiated by a user equipment (UE) can be shared with other one or more UEs, so that the one or more UEs can have higher probability to access a channel, leading to a low latency communication.

Figure 1:
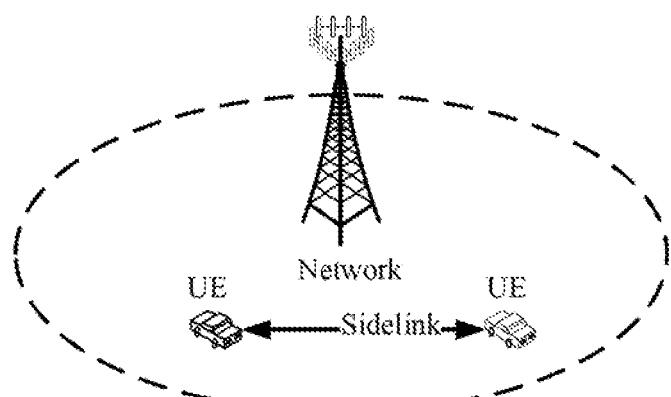
FIG. 1 is a schematic diagram illustrating sidelink communication in a coverage of a network.
Figure 2:
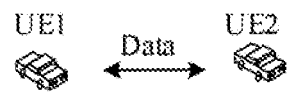
FIG. 2 is a schematic diagram illustrating sidelink unicast transmission.
Figure 3:
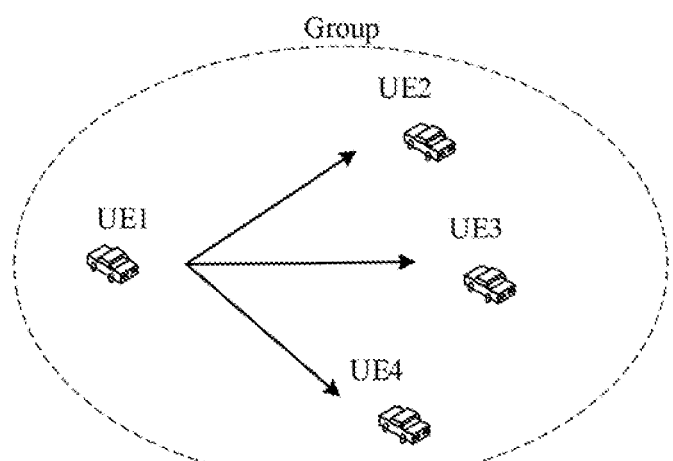
FIG. 3 is a schematic diagram illustrating sidelink multicast transmission.
Figure 4:
FIG. 4 is a schematic diagram illustrating sidelink broadcast transmission.
Figure 5:
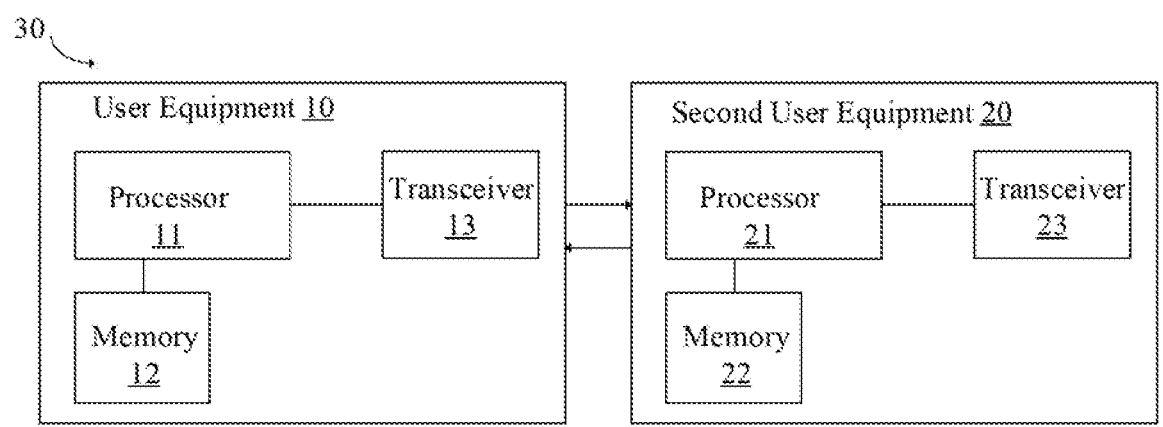
FIG. 5 is a block diagram of user equipments (UEs) of communication in a communication network system according to an embodiment of the present disclosure.

FIG. 5 illustrates that, in some embodiments, a user equipment (UE) 10 and a second UE 20 of communication in a communication network system 30 according to an embodiment of the present disclosure are provided. The communication network system 30 includes the UE 10 the second UE 20. The UE 10 may include a memory 12, a transceiver 13, and a processor 11 coupled to the memory 12, the transceiver 13. The second UE 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of first information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond.

In some embodiments, the processor 11 is configured to initiate a channel occupancy (CO) and the transceiver 13 is configured to share the CO to at least a second UE 20. This can solve issues in the prior art and provide a method that the CO initiated by the UE can be shared with other one or more UEs, so that the one or more UEs can have higher probability to access a channel, leading to a low latency communication.

Figure 6:
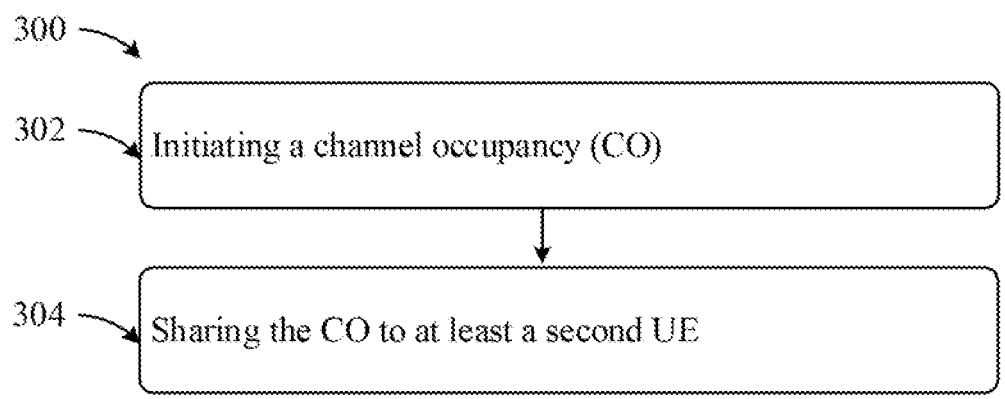
FIG. 6 is a flowchart illustrating a method of transmission of a UE according to an embodiment of the present disclosure.

FIG. 6 illustrates a method 300 of communication of a UE according to an embodiment of the present disclosure. In some embodiments, the method 300 includes: a block 302, initiating a channel occupancy (CO), and a block 304, sharing the CO to at least a second UE. This can solve issues in the prior art and provide a method that the CO initiated by the UE can be shared with other one or more UEs, so that the one or more UEs can have higher probability to access a channel, leading to a low latency communication.

In some embodiments, the UE initiates the CO by transmitting a first transmission in a channel. In some embodiments, the UE transmits a first transmission in the channel after the channel is sensed as idle by performing a first channel access procedure. In some embodiments, the first channel access procedure comprises a random sensing duration, wherein the random sensing duration is relevant to a channel access priority class (CAPC) of the first transmission. In some embodiments, the second UE sharing the CO comprises the second UE transmitting a second transmission in the channel within the CO. In some embodiments, the second UE transmits the second transmission after the channel is sensed as idle by performing a second channel access procedure. In some embodiments, the second channel access procedure is different from the first channel access procedure.

In some embodiments, the second channel access procedure comprises a deterministic sensing duration. In some embodiments, the deterministic sensing duration comprises at least one of the following: 25 micro-second; 16 micro-second; or smaller than 16 micro-second. In some embodiments, the CAPC of a transmission is used to indicate a priority of the transmission. In some embodiments, the second transmission comprises a priority higher than or equal to a priority of the first transmission indicated by the CAPC. In some embodiments, the channel comprises a set of consecutive resource blocks (RBs) in frequency domain. In some embodiments, the first transmission is located within the set of consecutive RBs in frequency domain.

In some embodiments, the second transmission is located within the set of consecutive RBs in frequency domain. In some embodiments, the CO comprises a duration (COT) in time domain, wherein the second transmission is located within the COT in time domain. In some embodiments, the first transmission comprises a control information, wherein the control information indicates a CO sharing information. In some embodiments, the control information comprises a sidelink control information (SCI), wherein the SCI is detected by the second UE. In some embodiments, the SCI comprises a first stage SCI or a second stage SCI. In some embodiments, the CO sharing information comprises at least one of the following: an indication for CO sharing enable or disable, a CO remaining duration, a CO sharing destination, or a channel access information. In details, disable means forbidden for sharing.

In some embodiments, the indication for CO sharing enable comprises at least one of the following: a starting location for CO sharing, a sharing duration, or an ending location for CO sharing. In some embodiments, the SCI is transmitted in a physical sidelink control channel (PSSCH). In some embodiments, the starting location is relevant to the SCI. In some embodiments, the starting location comprises one of the following: a slot boundary, or an offset. In some embodiments, the offset comprises a first amount of symbols or slots.

In some embodiments, the sharing duration comprises a second amount of symbols or slots. In some embodiments, the sharing duration comprises a third amount of symbols or slots. In some embodiments, the third amount is relevant to a maximum COT, wherein the maximum COT is relevant to the CAPC of the first transmission. In some embodiments, the CO sharing destination comprises the second UE. In some embodiments, the CO sharing destination comprises an identity. In some embodiments, the identity corresponds to the second UE.

In some embodiments, a channel access procedure performed by the UE on the CO is different from a channel access procedure performed by the second UE on the CO. In some embodiments, the channel access procedure performed by the UE comprises a type 1 channel access procedure. In some embodiments, a channel sensing duration of the UE on the CO is not deterministic and depends on a channel access priority class (CAPC). In some embodiments, a channel sensing duration of the second UE on the CO is deterministic. In some embodiments, the second UE belongs to a first group, and the first group has a group identifier (ID). In some embodiments, the second UE has a UE ID. In some embodiments, the UE is a group leader.

In some embodiments, CO sharing related information is provided by the UE. In some embodiments, the CO sharing related information comprises at least one of the following: an indication related to on/off sharing; an indication related to remaining CO duration; or a first indication related to a sharing destination ID. In some embodiments, the on/off sharing comprises that a CO is allowed for sharing or a CO is forbidden for sharing. In some embodiments, the remaining CO duration comprises a duration in which the CO is shared. In some embodiments, the duration in which the CO is shared comprises amount of symbols or slots. In some embodiments, the sharing destination ID indicates an ID related to the second UE. In some embodiments, the ID related to the second UE comprises at least a UE ID of the second UE and/or a group ID, which the second UE belongs to.

In some embodiments, the CO sharing related information is in control information. In some embodiments, the control information comprises sidelink control information (SCI). In some embodiments, the CO sharing related information gives selection of a group UE sharing or a UE sharing. In some embodiments, listen before talk (LBT) related information is provided by the UE. In some embodiments, the LBT related information comprises at least an LBT type, an LBT duration, and a CAPC.

EXAMPLE

A UE intends to perform a transmission in a shared spectrum. The UE first performs a type 1 channel access procedure, where the channel sensing duration is not deterministic and the duration depends on the channel access priority class (CAPC). The CAPC indicates the priority of the traffic to be transmitted. Higher CAPC (smaller CAPA value) will lead to a shorter sensing duration, which further leads to higher probability of passing the channel access procedure with success, where the channel access procedure is successful means that the channel is sensed to be idle during the sensing duration. Thus, the UE can start to transmit the transmission. Once the UE starts the transmission, at the same time, the channel occupancy (CO) of the UE is initiated. The CO has a maximum duration (MCO), in which the UE can continue transmitting up to the MCO duration. After the MCO duration, the UE must stop transmission. The duration of the MCO depends on the CAPC as well, i.e. lower priority leads to a longer MCO.

Figure 7:
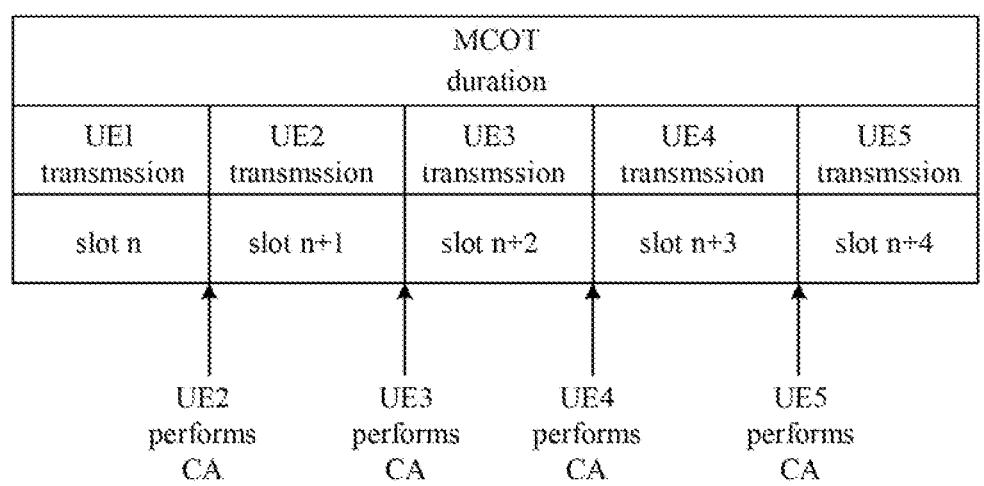
FIG. 7 is a schematic diagram illustrating an example of a UE initiating a CO and sharing the CO with other UEs according to an embodiment of the present disclosure.

FIG. 7 illustrates an example of a UE initiating a CO and sharing the CO with other UEs according to an embodiment of the present disclosure. In this example, UE1 initiates a CO and shares the CO with other UEs, where resources for the other UEs are pre-scheduled or pre-defined. The scheduled UEs perform channel access procedure in the corresponding scheduled resources and the channel access procedure has deterministic sensing duration. One example is that UE1 initiates a CO and it does not need to transmit all the time during MCO, e.g. MCO duration contains 5 slots, and UE1 only needs the first slot for transmission. Then, the UE can share its own CO with another UE or with other UEs, as illustrated in FIG. 7. In this example, the UE1 can share its CO with UE2 to UE5, where the UE2 to UE5 need to perform a special type of channel access procedure, which has deterministic sensing duration, e.g. 25 us or 16 us. This special channel access procedure gives higher probability to access the channel.

Optionally, the transmission resources for UE2 to UE5 are pre-configured or pre-scheduled, i.e. UE2 transmission in slot n+1, UE3 transmission in slot n+2, etc. In this case, the UE will only perform channel access (CA) in the corresponding pre-configured resources within the UE1's CO as illustrated in FIG. 7. Moreover, this pre-scheduling or pre-configuration can be decided by UE1 who initiates the CO or another UE who is known to UE1 to UE5. One example of such deciding UE (UE1) is a group leader of a group in which UE1 to UE5 are group members.

FIG. 8 illustrates an example of a UE initiating a CO and sharing the CO with other UEs according to an embodiment of the present disclosure. In this example, UE1 initiates a CO and shares the CO with other UEs, where for a given resource within the CO, multiple UEs can access to the channel based on channel access procedure, whoever gets the channel transmits in the resource. Optionally, there is no pre-configured or pre-scheduled resources for respective UEs, when UE 1's CO is shared, all the UEs can perform channel access to the resources that are allowed for CO sharing. In this case, potential contention still exists for different UEs trying to access to the same resource.

Figure 9:
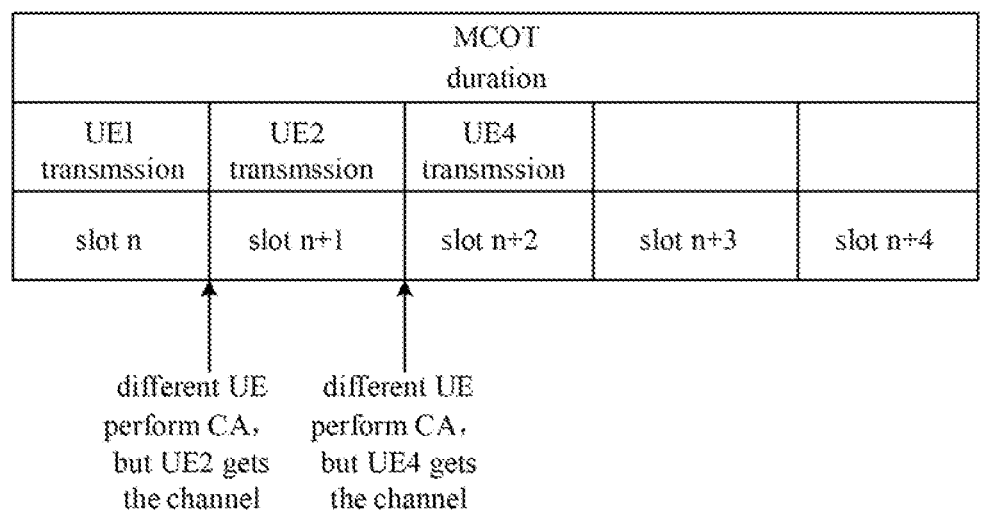
FIG. 9 is a schematic diagram illustrating an example of a UE initiating a CO and sharing the CO with other UEs according to an embodiment of the present disclosure.

FIG. 9 illustrates an example of a UE initiating a CO and sharing the CO with other UEs according to an embodiment of the present disclosure. In this example, UE1 initiates a CO and shares the CO with other UEs, where for a given resource within the CO, the channel is reserved for a dedicated UE. In example, the slot n+3 is reserved for UE4 only and other UEs should not attempt transmitting in this slot. Optionally, the UE1 can indicate CO sharing for a dedicated UE on the dedicated resources. As illustrated in FIG. 9, where the UE1 initiates a CO and transmits a data transmission to the UE4 in slot n, and the UE1 expects to receive an acknowledgement from the UE4 in slot n+3. In this example, since the slot n+3 is within the UE1's MCO, the UE1 can specifically indicate that the channel access to slot n+3 is reserved for UE4 acknowledgement and the other UEs can share the CO in other slots than the slot n+3.

The design of realizing this reservation has alternative options. In one option, the UE1 sends a control information together with the data transmission. The control information gives a UE ID and the corresponding reserved resources, e.g. the UE1 indicates UE4 and slot n+3 for the reservation specifically for UE4.

Optionally, the acknowledgement feedback resource and the data transmission resource are associated, and the association is pre-configured. One example is that for data transmission in slot n, the corresponding acknowledgement is pre-configured in slot n+3, so that there is no additional indication for the acknowledgement resource allocation. Optionally, the acknowledgement resource can be further accurate to a symbol level with starting symbol and symbol length configurations. In this case, the resource association is pre-configured to a group of UEs, i.e. all the group members know the resource association, the UE1 will only indicate an UE ID, e.g. UE4 in the control information to let all the group members know that the data transmission targets the destination of UE4. Thus, the other group members will know that the UE4 is assumed to feedback the acknowledgement in slot n+3. Then, the other group members except for UE4 will not try channel accessing for slot n+3.

The control information is transmitted together with the data transmission. The control information is carried in physical control channel and the data transmission is carried in the physical shared channel. If the transmission is operated in sidelink, the control information is carried in physical sidelink control channel (PSCCH), and the data transmission is carried in physical sidelink shared channel (PSSCH). Optionally, the control information can be transmitted in more than one physical control channels, e.g. PSCCH1 and PSCCH2, where both of two control channels are transmitted together with the data transmission. At least one control information in PSCCH1 is different from at least one control information in PSCCH2.

The control information includes the content at least one of the following: remaining CO duration; channel access related information; CO sharing destination; or CO sharing information.

Figure 10:
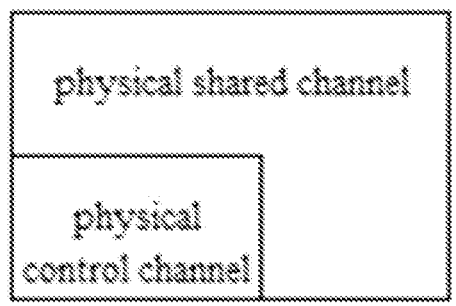
FIG. 10 is a schematic diagram illustrating an example that a transmission contains data transmission in physical shared channel and control information in physical control channel according to an embodiment of the present disclosure.
Figure 11:
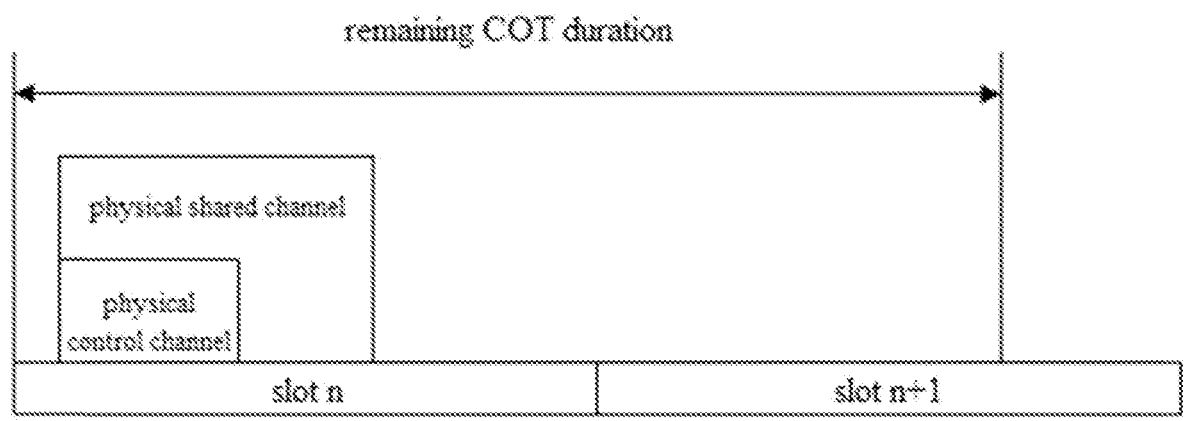
FIG. 11 is a schematic diagram illustrating an example that remaining CO duration is determined by a starting symbol location and CO duration according to an embodiment of the present disclosure.
Figure 12:
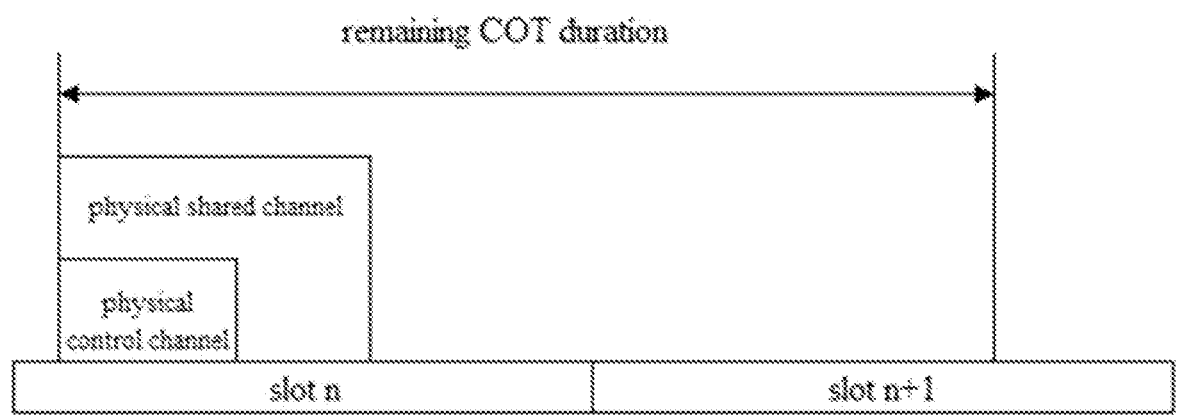
FIG. 12 is a schematic diagram illustrating an example that remaining CO duration is determined by a starting symbol location and CO duration according to an embodiment of the present disclosure.
Figure 13:
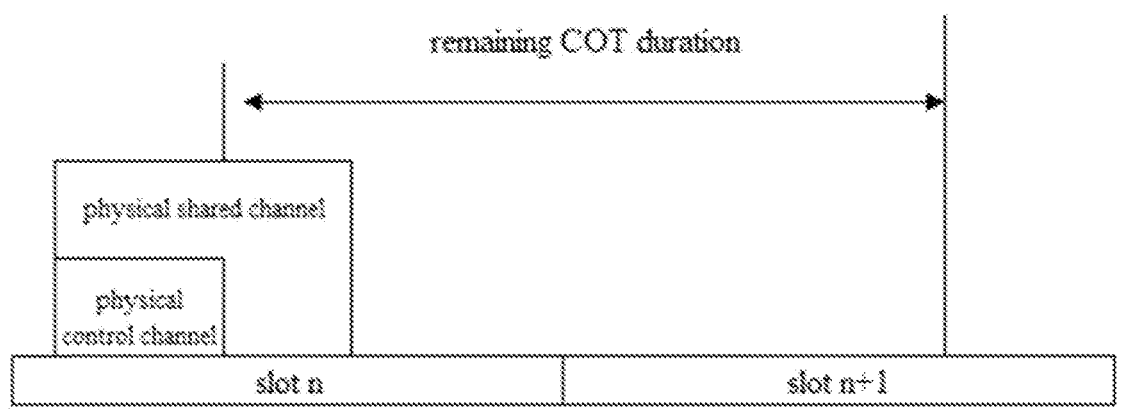
FIG. 13 is a schematic diagram illustrating an example that remaining CO duration is determined by a starting symbol location and CO duration according to an embodiment of the present disclosure.

Remaining CO Duration:

This information is used to indicate when the CO duration ends. Thus, the other UE will only perform the special channel access procedure within the CO. Optionally, the remaining CO duration is indicated by a starting symbol and length of duration in terms of amount of symbols, or a starting slot and amount of slots for CO duration. The starting symbol location is relevant to the physical control channel carrying control information. For example, the starting symbol location can be the first symbol of the slot where the physical control channel is located, or the last symbol of the physical control channel, or the first symbol of the physical control channel. FIG. 10 illustrates that, in some embodiments, a transmission contains data transmission in physical shared channel and control information in physical control channel. FIG. 11 illustrates that, in some embodiments, remaining CO duration is determined by a starting symbol location and CO duration, where starting symbol location is the first symbol of the slot in which control information is transmitted. FIG. 12 illustrates that, in some embodiments, remaining CO duration is determined by a starting symbol location and CO duration, where starting symbol location is the first symbol of the physical control channel. FIG. 13 illustrates that, in some embodiments, remaining CO duration is determined by a starting symbol location and CO duration, where starting symbol location is the last symbol of the physical control channel.

Channel Access Related Information:

This information is used to indicate the channel access type or cyclic prefix extension or CAPC. The indicated CAPC refers to the CAPC used by the initiating UE when initiating the CO. In our example, the CAPC refers to the CAPC used by the UE1 when performing the channel access procedure. When the CO sharing is enabled, the other UE to share the UE1's CO needs to check if the CAPC of the data to be transmitted by the other UE in the UE1's CO is higher or equal priority to the CAPC of the UE1. If the priority is higher or equal, the CO can be shared, otherwise, the UE cannot share UE1's CO. The CAPC is defined in the table below, where p with smaller number indicates higher priority, also the MCOT duration is relevant to the CAPC.

| Channel Access Priority Class (p) | $m_p$ | $CW_{min,p}$ | $CW_{max,p}$ | $T_{m\ cot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Optionally, channel access information includes channel access type, e.g. type 1, type 2A, type 2B, or type 2C, where type 1 is similar to the type 1 downlink (DL) channel access as described in clause 4.2.1.1 of TS37.213.

Optionally, channel access information includes cyclic prefix (CP) extension. The CP extension at the UE comprises one of the followings: 0 (i.e. no CP extension) or C1*symbol length–25 us or C2*symbol length–16 us—TA or C3*symbol length–25 us—TA, where C1=1 for 15 and 30 kHz SCS, C1=2 for 60 kHz SCS, and C2 and C3 are pre-configured.

CO Sharing Destination:

This information is used to indicate CO sharing is for all UEs in the coverage range or only for a dedicated group of UEs or only for a dedicated UE. In case the CO sharing is allowed only for a group of UEs, this information should include a group ID, thus, a group of UEs belong to the group ID will be sharing the CO. Optionally, if the CO sharing is for a dedicated UE, the control information needs to include a UE ID. Optionally, a UE CO can be shared by both a UE group and a dedicated UE. One example is that the initiating UE can reserve a dedicated resource in the CO to be shared with a dedicated UE, while the other resources in the CO are shared with a group of UEs or all the UEs in the coverage. To this end, both group ID and UE ID need to be included in the control information. Optionally, to select an initiating UE, there are also multiple options: one option is that the initiating UE needs to be a group leader, so that the group leader can initiate a CO and then share this CO with the group members. Optionally, the initiating UE can be group member, and the CO can be shared with all the group members. Another option is that no restriction on the role of initiating UE, therefore, every UE can become initiating UE.

Figure 14:
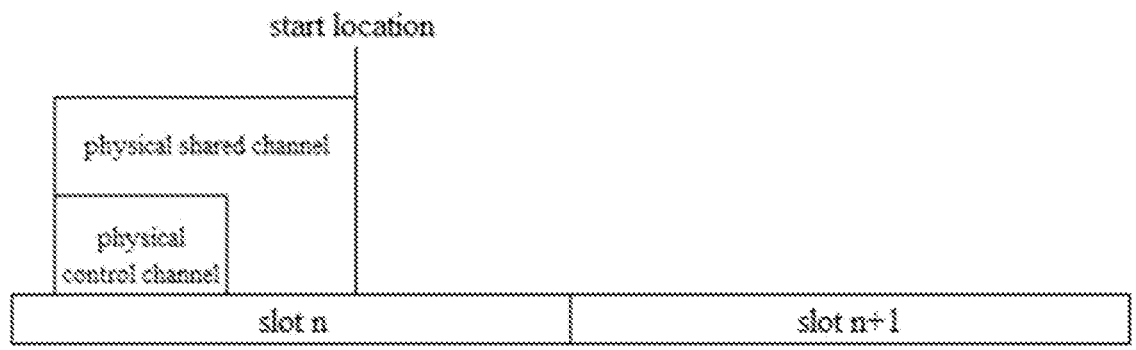
FIG. 14 is a schematic diagram illustrating an example of start location for CO sharing according to an embodiment of the present disclosure.
Figure 15:
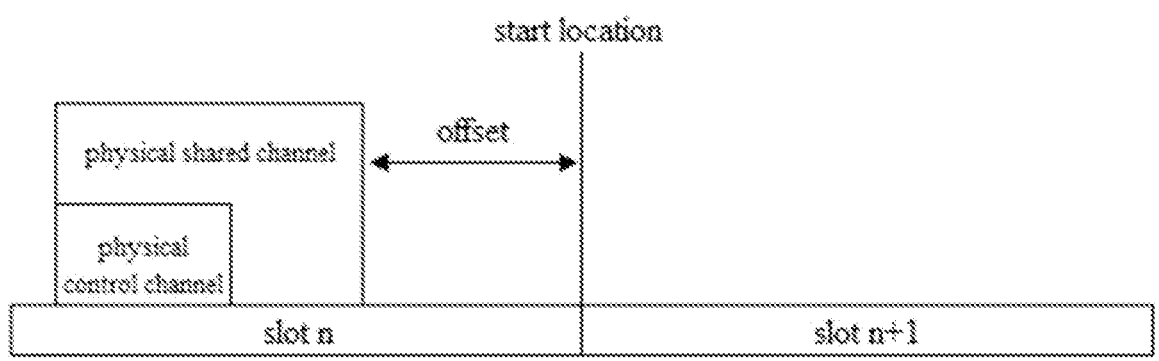
FIG. 15 is a schematic diagram illustrating an example of start location for CO sharing according to an embodiment of the present disclosure.

CO Sharing Information:

The CO sharing information will inform the other UE a starting location for which the other UE can start to share the channel. The starting location can be relevant to the physical shared channel, e.g. the last symbol of the physical shared channel. FIG. 14 illustrates that, in some embodiments, start location for CO sharing is provided, and the CO before the start location is not shared. The start location is the last symbol of the transmission of the initiating UE. e.g. the last symbol of physical shared channel in our example. FIG. 15 illustrates that, in some embodiments, start location for CO sharing is provided, and the CO before the start location is not shared. The start location is the first symbol of an offset slot with respect to the initiating transmission. The value of offset is indicated in the control information. Optionally, if a UE shares a channel occupancy initiated by a second UE using the channel access procedures described in clause 4.2.1.1 of TS37.213 on a channel, the UE may transmit a transmission that follows a PSSCH transmission by the second UE after a gap as follows: The transmission shall contain transmission to the second UE that initiated the channel occupancy and can include non-unicast and/or unicast transmissions where any unicast transmission that includes user plane data is only transmitted to the second UE that initiated the channel occupancy. Optionally, if the higher layer parameters, e.g. a COT sharing energy detection threshold, is not configured, the transmission should not include any unicast transmissions with user plane data and the transmission duration is not more than the duration of 2, 4, and 8 symbols for subcarrier spacing of 15, 30, and 60 kHz of the corresponding channel, respectively. Optionally, if the gap is up to 16 us, the UE can transmit the transmission on the channel after performing a Type 2C channel access, which is similar to a type 2C DL channel access as described in clause 4.1.2.3 of TS37.213. Optionally, if the gap is 25 us or 16 us, the gNB can transmit the transmission on the channel after performing a Type 2A or a Type 2B channel access procedures, which are similar to a type 2A and a 2B DL channel access as described in clause 4.1.2.1 of TS37.213 and 4.1.2.2 of TS37.213, respectively.

Optionally, for the case where a UE shares a channel occupancy initiated by a second UE, the UE may transmit a transmission that follows a PSSCH transmission by the second UE as follows: If the higher layer parameter e.g. a COT sharing energy detection threshold, is provided, the UE is configured by a COT sharing list where the list provides a table configured by higher layer. Each row of the table provides a channel occupancy sharing information One row of the table is configured for indicating that the channel occupancy sharing information is not available. Optionally, if the 'COT sharing information' in a SCI from the UE indicates a row index that corresponds to an indication that, the UE can share the second UE channel occupancy starting from an offset slots from the end of the slot where the SCI is detected, for a duration of D slots where the offset, the duration D and the CAPC of the second UE are indicated in the SCI by indicating a row of the table. Optionally, the higher layer parameter e.g. a COT sharing energy detection threshold, is not provided and if 'COT sharing information' in CG-UCI indicates '1', the UE can share the second UE channel occupancy and start the DL transmission X symbols from the end of the slot where the SCI is detected. The transmission should not include any unicast transmissions with user plane data and the transmission duration is not more than the duration of 2, 4 and 8 symbols for subcarrier spacing of 15, 30, and 60 kHz of the corresponding channel, respectively. Optionally, for the case where the second UE uses channel access procedures as described in clause 4.1.1 of TS37.213 to initiate a transmission and shares the corresponding channel occupancy with the UE that transmits a transmission as described in clause 4.2.1.2 of TS37.213, the UE may transmit a transmission within its channel occupancy that follows the second UE's transmission if any gap between any two transmissions in the gNB channel occupancy is at most 25 us. In this case the following applies: If the gap is 25 us or 16 us, the UE can transmit the transmission on the channel after performing the Type 2A or the Type 2B channel access procedures, respectively. Optionally, if the gap is up to 16 us, the UE can transmit the transmission on the channel after performing the Type 2C channel access.

Commercial interests for some embodiments are as follows. 1, solving issues in the prior art. 2, providing a method that the CO initiated by the UE can be shared with other one or more UEs, so that the one or more UEs can have higher probability to access a channel, leading to a low latency communication. 3, providing a good communication performance. 4, providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 16:
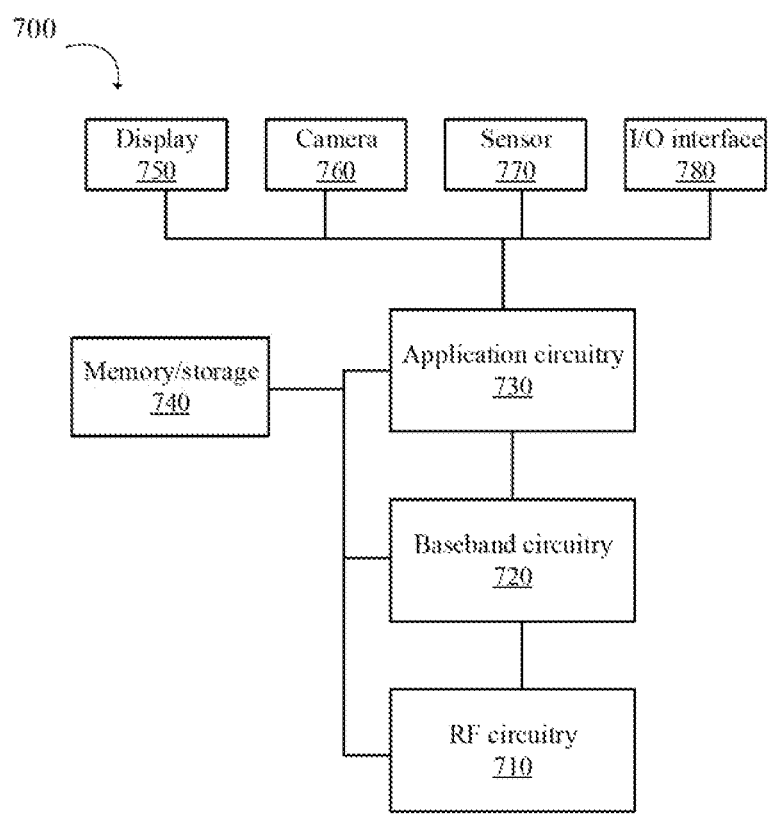
FIG. 16 is a block diagram of a system for wireless communication according to an embodiment of the present disclosure.

FIG. 16 is a block diagram of an example system 700 for wireless communication according to an embodiment of the present disclosure. Embodiments described herein may be implemented into the system using any suitably configured hardware and/or software. FIG. 16 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental states and/or location first information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network. e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of performing transmission in a shared spectrum by a user equipment (UE), comprising:
   initiating a channel occupancy (CO); and
   sharing the CO to at least a second UE,
   wherein the UE transmits a first transmission in the channel after the channel is sensed as idle by performing a first channel access procedure,
   wherein the first channel access procedure comprises a random sensing duration, the random sensing duration is a duration that only exists prior to the channel being sensed as idle, the random sensing duration is relevant to a channel access priority class (CAPC) of the first transmission, and a higher CAPC leads to a shorter random sensing duration.

2. The method of claim 1, wherein the second UE sharing the CO comprises the second UE transmitting a second transmission in the channel within the CO, and the second UE transmits the second transmission after the channel is sensed as idle by performing a second channel access procedure.

3. The method of claim 2, wherein at least one of the following applies:
   the second channel access procedure is different from the first channel access procedure; or,
   the second channel access procedure comprises a deterministic sensing duration.

4. The method of claim 1, wherein the first transmission comprises a control information, wherein the control information indicates a CO sharing information.

5. The method of claim 4, wherein the CO sharing information comprises at least one of the following:
   an indication for CO sharing enable or disable, a CO remaining duration, a CO sharing destination, or a channel access information, and
   the indication for CO sharing enable comprises at least one of the following: a starting location for CO sharing, a sharing duration, or an ending location for CO sharing.

6. The method of claim 5, wherein the starting location is relevant to the SCI, and the starting location comprises one of the following: a slot boundary, or an offset, the offset comprising a first amount of symbols or slots and the sharing duration comprising a second amount of symbols or slots.

7. The method of claim 5, wherein the CO sharing destination comprises the second UE, and the CO sharing destination comprises an identity,
   wherein the identity corresponds to the second UE; or, the identity indicates a group of UEs, the second UE belonging to the group.

8. A user equipment (UE), comprising:
   a memory;
   a transceiver; and
   a processor coupled to the memory and the transceiver;
   wherein:
   the processor is configured to initiate a channel occupancy (CO); and
   the transceiver is configured to share the CO to at least a second UE,
   wherein the transceiver transmits a first transmission in the channel after the channel is sensed as idle by performing a first channel access procedure,
   wherein the first channel access procedure comprises a random sensing duration, the random sensing duration is a duration that only exists prior to the channel being sensed as idle, the random sensing duration is relevant to a channel access priority class (CAPC) of the first transmission, and a higher CAPC leads to a shorter random sensing duration.

9. The UE of claim 8, wherein the second UE sharing the CO comprises the second UE transmitting a second transmission in the channel within the CO.

10. The UE of claim 8, wherein the CAPC of a transmission is used to indicate a priority of the transmission, and
the second transmission comprises a priority higher than or equal to a priority of the first transmission indicated by the CAPC.

11. The UE of claim 8, wherein the first transmission comprises a control information, wherein the control information indicates a CO sharing information.

12. The UE of claim 11, wherein the control information comprises a sidelink control information (SCI), wherein the SCI is sensed by the second UE, and the SCI comprises a first stage SCI or a second stage SCI.

13. The UE of claim 11, wherein the CO sharing information comprises at least one of the following: an indication for CO sharing enable or disable, a CO remaining duration, a CO sharing destination, or a channel access information; and
the indication for CO sharing enable comprises at least one of the following: a starting location for CO sharing, a sharing duration, or an ending location for CO sharing.

14. The UE of claim 13, wherein the sharing duration comprises a third amount of symbols or slots, and
the third amount is relevant to a maximum COT, wherein the maximum COT is relevant to the CAPC of the first transmission.

15. The UE of claim 9, wherein the second transmission comprises a second SCI, wherein the second SCI comprises a second CO sharing information, and
at least one information is same in the CO sharing information of the SCI and in the second CO sharing information of the second SCI.

16. A chip, comprising:
a processor, configured to call and run a computer program stored in a memory, to cause a device in which the chip is installed to perform operations of:
initiating a channel occupancy (CO); and
sharing the CO to at least a second UE,
wherein the device transmits a first transmission in the channel after the channel is sensed as idle by performing a first channel access procedure,
wherein the first channel access procedure comprises a random sensing duration, the random sensing duration is a duration that only exists prior to the channel being sensed as idle, the random sensing duration is relevant to a channel access priority class (CAPC) of the first transmission, and a higher CAPC leads to a shorter random sensing duration.

17. The UE of claim 9, wherein the second UE transmits the second transmission after the channel is sensed as idle by performing a second channel access procedure.

18. The UE of claim 17, wherein at least one of the following applies: the second channel access procedure is different from the first channel access procedure; or,
the second channel access procedure comprises a deterministic sensing duration.

19. The UE of claim 13, wherein the starting location is relevant to the SCI, and the starting location comprises one of the following: a slot boundary, or an offset, the offset comprising a first amount of symbols or slots and the sharing duration comprising a second amount of symbols or slots.

20. The UE of claim 13, wherein the CO sharing destination comprises the second UE, and the CO sharing destination comprises an identity,
wherein the identity corresponds to the second UE; or, the identity indicates a group of UES, the second UE belonging to the group.

* * * * *